United States Patent
King

(10) Patent No.: US 10,567,175 B2
(45) Date of Patent: *Feb. 18, 2020

(54) METHOD AND SYSTEM BLOCKCHAIN VARIANT USING DIGITAL SIGNATURES

(71) Applicant: MASTERCARD INTERNATIONAL INCORPORATED, Purchase, NY (US)

(72) Inventor: David J. King, Guildford (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,568

(22) Filed: Nov. 21, 2018

(65) Prior Publication Data

US 2019/0097813 A1    Mar. 28, 2019

Related U.S. Application Data

(63) Continuation of application No. 15/935,455, filed on Mar. 26, 2018, now Pat. No. 10,171,248, which is a
(Continued)

(51) Int. Cl.
*H04L 29/06* (2006.01)
*H04L 9/32* (2006.01)

(52) U.S. Cl.
CPC .......... *H04L 9/3247* (2013.01); *H04L 9/3239* (2013.01); *H04L 9/3268* (2013.01);
(Continued)

(58) Field of Classification Search
CPC combination set(s) only.
See application file for complete search history.

(56) References Cited

U.S. PATENT DOCUMENTS

2002/0091922 A1    7/2002    Shrader et al.
2006/0020811 A1    1/2006    Tan
(Continued)

FOREIGN PATENT DOCUMENTS

AU    2005264830 A1    1/2006
CN    101546407 A    9/2009
(Continued)

OTHER PUBLICATIONS

International Search Report and Written Opinion issued by the International Search Authority dated Apr. 5, 2017 in corresponding PCT Application No. PCT/US2016/066459 (12 pages).
(Continued)

*Primary Examiner* — Khoi V Le
(74) *Attorney, Agent, or Firm* — Buchanan Ingersoll & Rooney PC

(57) ABSTRACT

A method for using digital signatures for signing blockchain transactions includes: generating a domain key pair comprising a domain private key and a domain public key, wherein the domain public key is signed after generation; receiving a plurality of member public keys, wherein each member public key is received from an associated member of a blockchain network and is a public key in a key pair comprising the member public key and a member private key corresponding to the associated member; signing each member public key using the domain private key; receiving a transaction block from a specific member of the blockchain network, wherein the transaction block includes a plurality of blockchain transaction values and a hash signed using the member private key corresponding to the specific member; signing the received transaction block using the domain private key; and transmitting the signed transaction block.

8 Claims, 8 Drawing Sheets

Related U.S. Application Data continuation of application No. 14/976,331, filed on Dec. 21, 2015, now Pat. No. 9,948,467.

(52) U.S. Cl.
CPC .......... *H04L 63/045* (2013.01); *H04L 63/061* (2013.01); *H04L 63/0823* (2013.01); *H04L 63/0853* (2013.01); *H04L 63/0876* (2013.01); *H04L 2209/38* (2013.01)

(56) References Cited

U.S. PATENT DOCUMENTS

| | | | |
|---|---|---|---|
| 2015/0088756 A1* | 3/2015 | Makhotin | G06Q 20/3829 705/71 |
| 2015/0180662 A1 | 6/2015 | Cui et al. | |
| 2015/0287026 A1* | 10/2015 | Yang | G06Q 20/3678 705/69 |
| 2015/0324789 A1* | 11/2015 | Dvorak | G06Q 20/3823 705/67 |
| 2015/0324791 A1* | 11/2015 | Khan | G06Q 20/3821 705/71 |
| 2016/0098723 A1* | 4/2016 | Feeney | G06Q 20/4016 705/75 |
| 2016/0218879 A1* | 7/2016 | Ferrin | H04L 9/3247 |
| 2017/0005804 A1* | 1/2017 | Zinder | H04L 9/3247 |
| 2017/0180134 A1 | 6/2017 | King | |
| 2018/0212783 A1 | 7/2018 | King | |

FOREIGN PATENT DOCUMENTS

| | | |
|---|---|---|
| CN | 103595530 A | 2/2014 |
| EP | 2942995 A1 | 11/2015 |

OTHER PUBLICATIONS

Examination report No. 1 for standard patent application dated Nov. 21, 2018, by the Australian Patent Office in corresponding Australian Patent No. 2016378211. (3 pages).

Tewari et al., Netcoin: A Traceable P2P Electronic Cash System, 2015 IEEE 22nd International Conference on Web Services, Jul. 2015, pp. 472-478.

Saito, "Bitcoin and Expected Social Changes", Monthly Financial Journal, Jul. 1, pp. 1-8.

Office Action (Notification of Reasons for Refusal) dated Jun. 4, 2019, by the Japanese Patent Office in corresponding Japanese Patent Application No. 2018-550657, with an English translation of the Office Action. (8 pages).

Office Action dated Jun. 17, 2019, by the State Intellectual Property Office of P.R. China in corresponding Chinee Patent Application No. 201680071590.4. (7 pages).

Saito, "Upcoming Social Transformation with Bitcoin", Monthly Financial Journal, Jul. 1, 2015, vol. 56, No. 7, pp. 8-11.

Notice to Grant dated Jul. 30, 2019, by the Japanese Patent Office in corresponding Japanese Patent Application No. 2018-550657. (3 pages).

\* cited by examiner

METHOD AND SYSTEM BLOCKCHAIN VARIANT USING DIGITAL SIGNATURES

FIELD

The present disclosure relates to the use of digital signatures for signing blockchain transactions, specifically the use of digital signatures by multiple entities for use in the signing and validation of blockchain transactions for added security and more efficient validation.

BACKGROUND

Blockchains are used as a public ledger of electronic transactions. Each new block of transactions that is added to a blockchain provides for further validation of the previous blocks, resulting in the blockchain becoming stronger and stronger as the blockchain grows over time. Because past blocks in the blockchain never change, and because the blockchain does not lose or discard past blocks, the blockchain becomes an immutable, yet publicly accessibly, record of all transactions. Blockchains can also offer additional benefits that encourage their use in the conducting of electronic transactions, such as anonymity and security.

In order to generate new blocks for a blockchain, many blockchains rely on extensive computing power that utilizes a hashing algorithm combined with brute force searching to generate a hash that matches the previous block in the blockchain. To encourage participation in the searching, blockchains often allow for any user with any suitable computing device to participate, and will also often offer a reward to the user that successfully finds a suitable hash value. As more users participate, and as computing power increases, blockchains may experience more and more waste of energy and computational power.

Thus, there is a need for a technical solution whereby new blocks for a blockchain may be generated that are reliable and secure, but without resulting in significant computational and energy waste. The use of signatures by verified and trusted participants may ensure that new blocks are reliable and secure, while enabling the blocks to be suitably verified for inclusion in a blockchain, while also requiring significantly less computational power. In addition, by utilizing only trusted entities, the participant pool may be limited, which may decrease the amount of energy wasted to produce new blocks for the blockchain. Thus, there is a need for a technical solution that utilizes a trusted pool of participants and digital signatures for the signing of blockchain transactions.

SUMMARY

The present disclosure provides a description of systems and methods for using digital signatures for signing blockchain transactions.

A method for using digital signatures for signing blockchain transactions includes: generating, by a generation module of a processing server, a domain key pair comprising a domain private key and a domain public key, wherein the domain public key is signed after generation; receiving, by a receiving device of the processing server, a plurality of member public keys, wherein each member public key is received from an associated member of a blockchain network and is a public key in a key pair comprising the member public key and a member private key corresponding to the associated member; signing, by a signing module of the processing server, each member public key of the plurality of member public keys using the domain private key; receiving, by the receiving device of the processing server, a transaction block from a specific member of the blockchain network, wherein the transaction block includes a plurality of blockchain transaction values and a hash signed using the member private key corresponding to the specific member; signing, by the signing module of the processing server, the received transaction block using the domain private key; and electronically transmitting, by a transmitting device of the processing server, the signed transaction block.

Another method for using digital signatures for signing blockchain transactions includes: storing, in a memory of a processing server, a blockchain, wherein the blockchain includes a plurality of transaction blocks, each transaction block including at least a plurality of blockchain transaction values; generating, by a generation module of the processing server, a member key pair comprising a member private key and a member public key; electronically transmitting, by a transmitting device of the processing server, the generated member public key to a signing authority associated with a blockchain network; receiving, by a receiving device of the processing server, a plurality of blockchain transaction values comprising a new transaction block; hashing, by a hashing module of the processing server, a first hash value via application of one or more hashing algorithms to a specific block of the plurality of transaction blocks included in the blockchain; generating, by the generation module of the processing server, a second hash value, wherein the second hash value corresponds to the first hash value; signing, by a signing module of the processing server, the generated second hash value using the generated member private key; and electronically transmitting, by the transmitting device of the processing server, the new transaction block and signed second hash value to the signing authority.

A system for using digital signatures for signing blockchain transactions includes: a transmitting device of a processing server; a generation module of the processing server configured to generate a domain key pair comprising a domain private key and a domain public key, wherein the domain public key is signed after generation; a receiving device of the processing server configured to receive a plurality of member public keys, wherein each member public key is received from an associated member of a blockchain network and is a public key in a key pair comprising the member public key and a member private key corresponding to the associated member; and a signing module of the processing server configured to sign each member public key of the plurality of member public keys using the domain private key. The receiving device of the processing server is further configured to receive a transaction block from a specific member of the blockchain network, wherein the transaction block includes a plurality of blockchain transaction values and a hash signed using the member private key corresponding to the specific member. The signing module of the processing server is further configured to sign the received transaction block using the domain private key. The transmitting device of the processing server is further configured to electronically transmit the signed transaction block.

Another system for using digital signatures for signing blockchain transactions includes: a signing module of a processing server; a memory of the processing server configured to store a blockchain, wherein the blockchain includes a plurality of transaction blocks, each transaction block including at least a plurality of blockchain transaction values; a generation module of the processing server configured to generate a member key pair comprising a member private key and a member public key; a transmitting device of the processing server configured to electronically transmit the generated member public key to a signing authority associated with a blockchain network; a receiving device of the processing server configured to receive a plurality of blockchain transaction values comprising a new transaction block; and a hashing module of the processing server configured to generate a first hash value via application of one or more hashing algorithms to a specific block of the plurality of transaction blocks included in the blockchain. The generation module of the processing server is further configured to generate a second hash value, wherein the second hash value corresponds to the first hash value. The signing module of the processing server is configured to sign the generated second hash value using the generated member private key. The transmitting device of the processing server is configured to electronically transmit the new transaction block and signed second hash value to the signing authority.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, additional information may be captured, such as a source address, timestamp, etc. In some embodiments, a blockchain may also consist of additional, and in some instances arbitrary, data that is confirmed and validated by the blockchain network through proof of work and/or any other suitable verification techniques associated therewith. In some cases, such data may be included in the blockchain as part of transactions, such as included in additional data appended to transaction data. In some instances, the inclusion of such data in a blockchain may constitute a transaction. In such instances, a blockchain may not be directly associated with a specific digital, virtual, fiat, or other type of currency.

System for Signing Blockchain Transactions Using Digital Signatures

Figure 1:
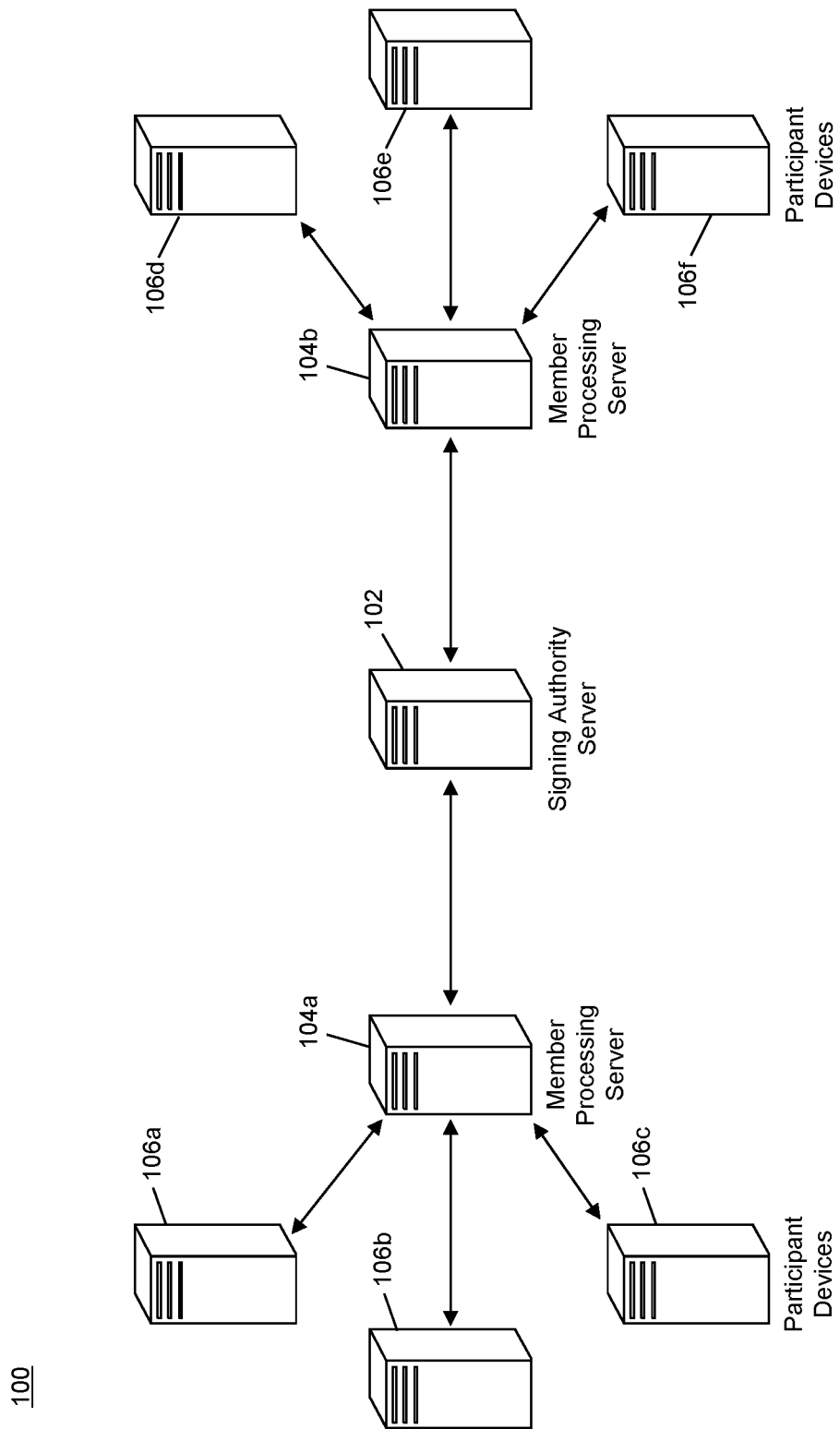
FIG. 1 is a block diagram illustrating a high level system architecture for signing blockchain transactions using digital signatures in accordance with exemplary embodiments.

FIG. 1 illustrates a system 100 for the signing of blockchain transactions by a trusted pool of participants using verifiable digital signatures.

The system 100 may include a signing authority server 102. The signing authority server 102, discussed in more detail below, may be associated with a blockchain and configured to digitally sign blocks of blockchain transactions for inclusion in the blockchain. In some instances, a blockchain may be associated with a single signing authority server 102, which may digitally sign every block that is added to the blockchain. In other instances, a blockchain may be associated with multiple signing authority servers 102, each of which may be configured to digitally sign blocks added to a blockchain separately, either for concurrent or redundant signing. In latter instances, different signing authority servers 102 may have different keys, for separate validation of respectively signed blocks by member systems, or may use the same key, with the resulting signed blocks compared for accuracy and validated by a member system or other signing authority server 102.

The system 100 may also include a plurality of member processing servers 104, illustrated in FIG. 1 as member processing servers 104a and 104b. Member processing servers 104, discussed in more detail below, may be associated with the blockchain and configured to digitally sign blockchain transactions and create blocks for inclusion in the blockchain. Member processing servers 104 may also be configured to validate digitally signed blocks that have been signed by other member processing servers 104 and/or signing authority servers 102 prior to inclusion in the blockchain. As discussed herein, the signing authority servers 102 and member processing servers 104 may comprise a "blockchain network," which may be understood by persons having skill in the relevant art to refer to the systems and infrastructure used in the management and maintenance of a blockchain.

The system 100 may also include a plurality of participant devices 106, illustrated in FIG. 1 as participant devices 106a, 106b, 106c, 106d, 106e, and 106f. Each participant device 106 may be a computing device suitable for submitting new blockchain transactions to a member processing server 104, for inclusion in a new block to be added to the blockchain. The computing device may be a desktop computer, laptop computer, notebook computer, table computer, cellular phone, smart phone, smart television, smart watch, wearable computing device, implantable computing device, etc. The participant device 106 may electronically transmit data associated with a blockchain transaction to a member processing server 104 for posting to the blockchain. The data transmitted to the member processing server 104 may be based on the type of transaction, properties of the blockchain, and other criteria, and may include, for example, a source address, a destination address, and an amount of blockchain currency to be transferred. In some instances, multiple source or destination address may be included, and a source address may be digitally signed by the participant device 106 for validation as an authorized user of the associated blockchain currency.

For use in digitally signing blocks and other data, the signing authority server 102 may generate a domain key pair. The domain key pair may be comprised of a domain private key and a corresponding domain public key. The domain keys may be used for the signing of blocks and other data, where the domain private key may be used to sign a piece of data and where the domain public key may be used (e.g., by another entity, such as a member processing server 104) to validate or otherwise verify the signature. The domain key pair may be generated using any suitable key pair generation algorithm. The digital signing of data using the domain private key may use any suitable method for the digital signature of data using a private key that is consistent with the functions discussed herein.

Once the domain key pair is generated, the signing authority server 102 may have the domain public key signed. In some embodiments, the domain public key may be self-signed by the signing authority server 102. In some instances, the domain public key may be self-signed only if the signing authority server 102 and member processing servers 104 are part of a closed network for access and/or submission to the associated blockchain. In other embodiments, the domain public key may be signed by a public authority, such as a trusted third party entity configured to sign public keys. The trusted third party may sign the domain public key, the signature of which may be validated by one or more member processing servers 104 in the blockchain network.

Each member processing server 104 may also generate a key pair, referred to herein as a "member" key pair. Each member key pair may be comprised of a member private key and a corresponding member public key. In some embodiments, the member key pair may be generated using the same key pair generation algorithm used by the signing authority server 102 in the generation of the domain key pair. Each member processing server 104 may securely store their respective member private key and may electronically transmit their respective member public key to a signing authority server 102 for signing. The member public keys may be electronically transmitted to a signing authority server 102 via superimposition on a data signal that is transmitted using any suitable type of communication network or method, such as a local area network, wide area network, wireless area network, radio frequency, Bluetooth, near field communication, the Internet, etc.

The signing authority server 102 may be configured to sign each of the member public keys using the domain private key. The signed member public keys may then be redistributed to the member processing servers 104 for later use in validation of signed blocks and blockchain transactions. In some embodiments, each member processing server 104 may receive a signed member public key for one or more other member processing servers 104 in the blockchain network, such as for use in validating signatures made by the one or more other member processing servers 104. In some instances, the signing authority server 102 may also distribute the signed domain public key to one or more member processing servers 104 as well, for use in the validation of signatures made by the signing authority server 102 using the domain private key.

In some embodiments, the signing authority server 102 may be configured to authenticate a member processing server 104 prior to the distribution of any keys to the member processing server 104. Authentication of member processing servers 104 may be performed using a standard registration scheme whereby a member processing server 104 and/or entity associated therewith may register with the signing authority server 102 as a trusted server for use in digitally signing blockchain transactions. For example, a member processing server 104 may provide industry credentials, identification information, detailed device data, etc. as part of the registration process to the signing authority 102, which may verify the authenticity of the data and register the server as a member processing server 104 in the blockchain network to whom keys may be distributed. In some instances, the signing authority server 102 may be configured to vet or otherwise determine the suitability of a processing server attempting to register as a member processing server 104 for use in digitally signing blockchain transactions. The determination may be based on, for example, the technology level of the processing server, the security protocols being used by the server and associated computing system, internal network infrastructure, etc. In some cases, the signing authority server 102 may limit the number of member processing servers 104, such as to a trusted group of member processing servers 104 of a limited size for security reasons.

After being registered and receiving the signed member public keys and signed domain public key, a member processing server 104 may receive blockchain transactions for posting to the blockchain. To generate a new block for the blockchain, the member processing server 104 must search for a hash that corresponds to a hash of the previous block in the blockchain to where the new block will be added. The member processing server 104 may hash the previous block using one or more suitable hashing algorithms to obtain a first hash value. The member processing server 104 may then search for a second hash value that corresponds to the first hash value. The correspondence may be an exact match (e.g., where both hash values are equivalent) or may correspond in one or more other manners, such as where the second hash value is a reverse of the first hash value, where a specific number of characters in the hash value are equivalent, where a number of the last characters in the first hash value are equivalent to the number of first characters of the second hash value, etc. The correspondence that may be accepted may be based on a desired time length for searching, a desired security level, preferences of the blockchain network, etc.

After a suitable second hash value has been found, the member processing server 104 may sign the hash value using their member private key. The member processing server 104 may then electronically transmit a block comprised of the blockchain transactions and the signed hash value to the signing authority server 102. The signing authority server 102 may then sign the block using their domain private key. The signing authority server 102 may distribute the digitally signed block to one or more member processing servers 104 for validation. In some embodiments, the digitally signed block may be validated by a member processing server 104 other than the member processing server 104 where the block originated. For instance, in the example illustrated in FIG. 1, the member processing server 104a may provide the transactions and signed hash value to the signing authority server 102, and the signed block may be distributed to the member processing server 104b for validation.

The member processing server 104 may use the signed domain public key associated with the signing authority server 102 that signed the block, as well as the signed member public key associated with the member processing server 104 that signed the hash value, to validate the block. Validation of the block may include application of the signed domain public key to the signed block using a suitable hashing algorithm to yield the transactions and signed hash value, as well as application of the signed member public key to the signed hash value to yield the unsigned hash value. The unsigned hash value may then be verified as equivalent to the hash value of the previous block in the blockchain to which the new block is to be added. Once the block has been validated, the new block may be added into the blockchain. In some embodiments, the block may first be validated by multiple member processing servers 104. In some instances, a new block may be validated by a participant device 106. In such an instance, the participant device 106 may receive the signed domain public key and signed member public key for use in validating the signed block as discussed above. In some cases, the member processing server 104 or participant device 106 performing the validation may also validate a certificate trust chain of the domain public key, such as used in the signing of the domain public key by the trusted third party entity.

The methods and systems discussed herein may provide for the signing and validation of new blocks of blockchain transactions in a blockchain that can be performed using less computational power and reduce energy waste while maintaining the same level of security used in existing blockchain systems. By using digital signatures, security and authenticity of transaction blocks can be maintained, while using less computational power, which may further result in more efficient adding of blocks to the blockchain and in turn, negate the use of additional nodes in the blockchain network and reduce energy waste. In addition, the use of digital signatures may also enable participant devices 106 to validate transaction blocks, which may be impossible or impractical for participant devices in traditional blockchain networks due to computational requirements.

Signing Authority Server

Figure 2:
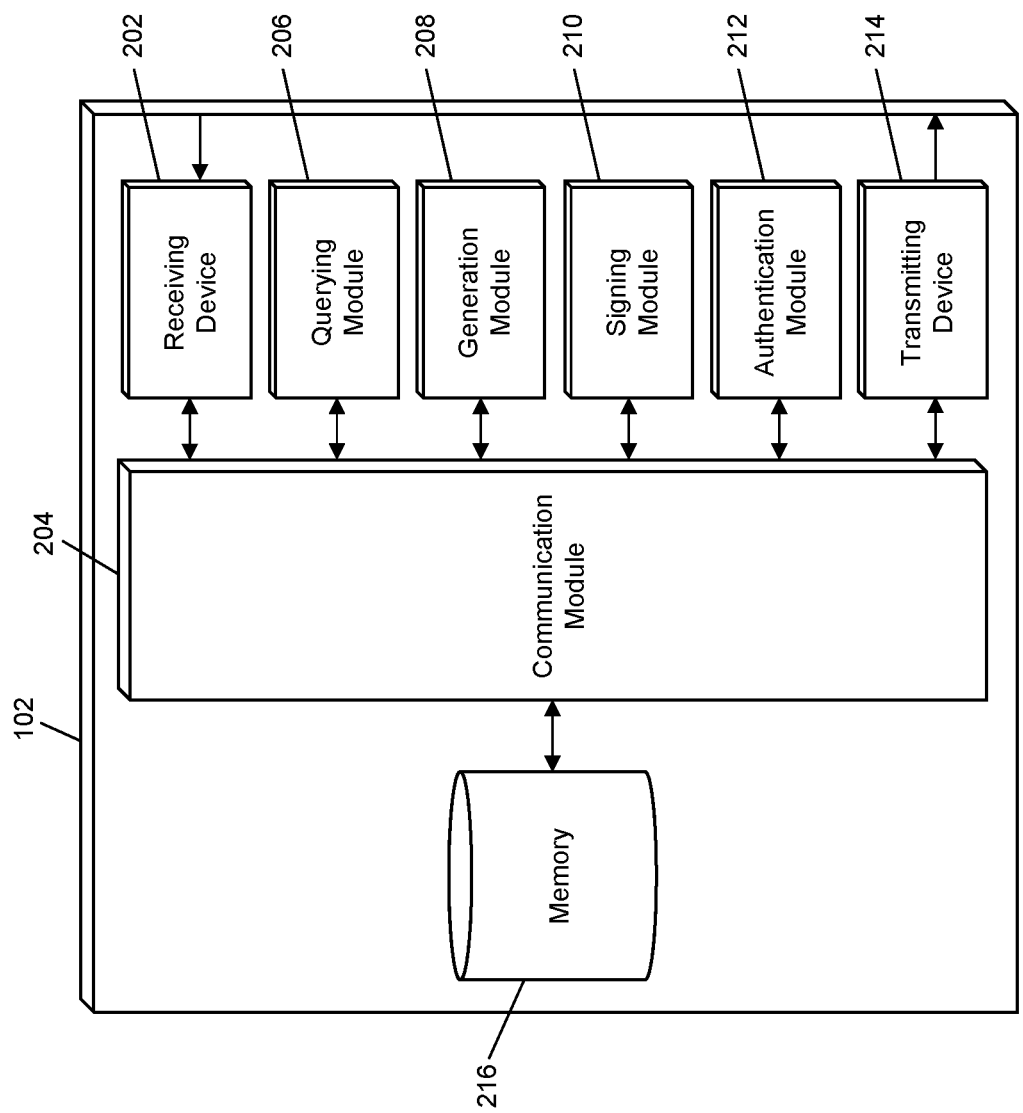
FIG. 2 is a block diagram illustrating the signing authority server of FIG. 1 for verifying signed blockchain transactions and digitally signing blockchain blocks in accordance with exemplary embodiments.
Figure 3:
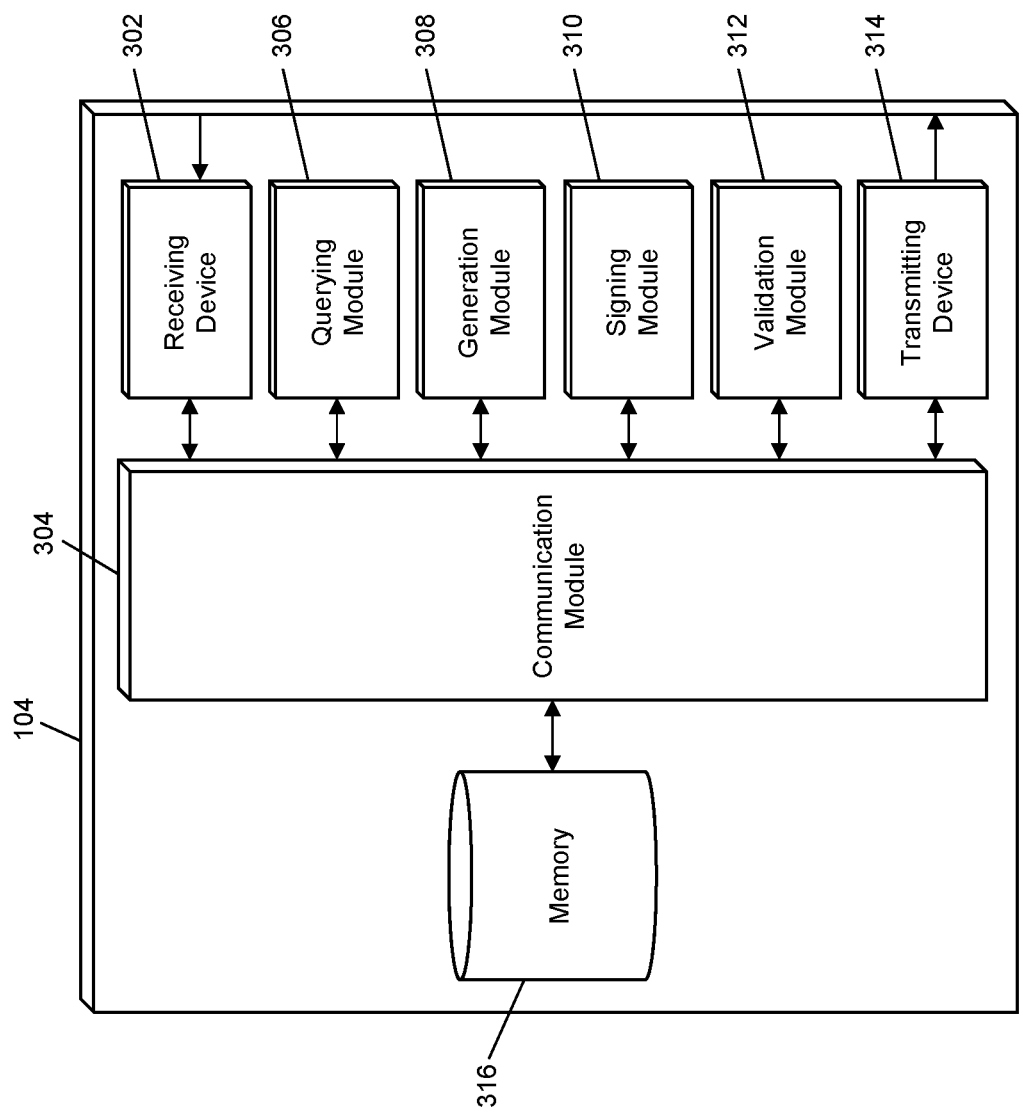
FIG. 3 is a block diagram illustrating the member processing server of FIG. 1 for digitally signing blockchain transactions and validation thereof in accordance with exemplary embodiments.

FIG. 2 illustrates an embodiment of the signing authority server 102 of the system 100. It will be apparent to persons having skill in the relevant art that the embodiment of the signing authority server 102 illustrated in FIG. 2 is provided as illustration only and may not be exhaustive to all possible configurations of the signing authority server 102 suitable for performing the functions as discussed herein. For example, the computer system 800 illustrated in FIG. 8 and discussed in more detail below may be a suitable configuration of the signing authority server 102.

The signing authority server 102 may include a receiving device 202. The receiving device 202 may be configured to receive data over one or more networks via one or more network protocols. In some instances, the receiving device 202 may also be configured to receive data from member processing servers 104, participant devices 106, and other entities via suitable communication networks, such as local area networks, wide area networks, radio frequency networks, the Internet. In some embodiments, the receiving device 202 may be comprised of multiple devices, such as different receiving devices for receiving data over different networks, such as a first receiving device for receiving data over near field communication and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by member processing servers 104. Data signals from member processing servers 104 may be superimposed with member public keys for signing, with transaction blocks and signed hash values for signing, and results from validations performed on signed transaction blocks. The receiving device 202 may also be configured to receive data signals electronically transmitted by participant devices 106, which may be superimposed with validation results. In some embodiments, the receiving device 202 may receive data signals from third party entities, such as data signals received during the signing of the domain public key.

The signing authority server 102 may also include a communication module 204. The communication module 204 may be configured to transmit data between modules, engines, databases, memories, and other components of the signing authority server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the signing authority server 102 and external components of the signing authority server 102, such as externally connected databases, display devices, input devices, etc. The signing authority server 102 may also include a processing device. The processing device may be configured to perform the functions of the signing authority server 102 discussed herein as will be apparent to persons having skill in the relevant art. In some embodiments, the processing device may include and/or be comprised of a plurality of engines and/or modules specially configured to perform one or more functions of the processing device, such as a querying module 206, generation module 208, signing module 210, authentication module 212, etc. As used herein, the term "module" may be software or hardware particularly programmed to receive an input, perform one or more processes using the input, and provide an output. The input, output, and processes performed by various modules will be apparent to one skilled in the art based upon the present disclosure.

The signing authority server 102 may include a querying module 206. The querying module 206 may be configured to execute queries on databases to identify information. The querying module 206 may receive one or more data values or query strings, and may execute a query string based thereon on an indicated database, such as a memory 216, to identify information stored therein. The querying module may then output the identified information to an appropriate engine or module of the signing authority server 102 as necessary. The querying module 206 may, for example, execute a query on the memory 216 to identify keys, blockchain data, and other data for use in the methods discussed herein.

The signing authority server 102 may include a generation module 208. The generation module 208 may be configured to generate key pairs and shared secrets. The generation module 208 may receive a request as input, may perform the requested functions to generate data, and may output the requested data for use by another module or engine of the signing authority server 102. For example, the generation module 206 may be configured to generate key pairs, such as a domain key pair used in the signing and validation of new blocks of blockchain transactions for inclusion in the blockchain. The generation module 206 may be configured to generate domain key pairs using any suitable key pair generation algorithm. Domain key pairs may be comprised of a domain private key and a corresponding domain public key.

The signing authority server 102 may further include a signing module 210. The signing module 210 may be configured to receive data to be signed, may sign the data using a private key, and may output the signed data to another module or engine of the signing authority server 102. In some instances, the signing module 210 may also be provided with the private key to use for signing. In other instances, the signing module 210 may obtain the private key, such as by issuing an instruction to the querying module 206 to identify a private key in the memory 216 for use in signing the data. The signing module 210 may be configured to, for example, sign member public keys and completed transaction blocks using the domain private key generated by the generation module 208. In some embodiments, the signing module 210 may also be configured to self-sign the domain private key generated by the generation module 208.

The signing authority server 102 may also include an authentication module 212. The authentication module 212 may be configured to receive data for authentication, may authenticate the data, and may output a result (e.g., success or failure) of the authentication to another module or engine of the signing authority server 102. For example, the signing authority server 102 may receive data from a member processing server 104 (e.g., received via the receiving device 202), which may be authenticated by the authentication module 212 as part of a standard registration process, which may register the member processing server 104 as a node in the blockchain network.

The signing authority server 102 may also include a transmitting device 214. The transmitting device 214 may be configured to transmit data over one or more networks via one or more network protocols. In some instances, the transmitting device 214 may be configured to transmit data to member processing servers 104, participant devices 106, and other entities via suitable communication networks, such as local area networks, wide area networks, radio frequency networks, the Internet. In some embodiments, the transmitting device 214 may be comprised of multiple devices, such as different transmitting devices for transmitting data over different networks, such as a first transmitting device for transmitting data over near field communication and a second transmitting device for transmitting data over the Internet. The transmitting device 214 may electronically transmit data signals that have data superimposed that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to member processing servers 104. Data signals electronically transmitted to member processing servers 104 may be superimposed with signed public keys, including signed member public keys and signed domain public keys, and signed transaction blocks for validation. The transmitting device 214 may also be configured to electronically transmit data signals superimposed with signed transaction blocks to participant devices 106 for validation thereby. In some instances, the transmitting device 214 may be further configured to electronically transmit data signals to third party entities, such as data signals superimposed with domain public keys for signing by a trusted third party.

The signing authority server 102 may also include the memory 216. The memory 216 may be configured to store data for use by the signing authority server 102 in performing the functions discussed herein. The memory 216 may be configured to store data using suitable data formatting methods and schema and may be any suitable type of memory, such as read-only memory, random access memory, etc. The memory 216 may include, for example, a domain private key, a signed domain public key, signed member public keys, data associating each signed member public key with a member processing server 104, a blockchain, etc. The memory 216 may be configured to store the key pair generation algorithm, hashing algorithms, and other algorithms for use in performing the functions of the signing authority server 102 discussed herein.

Signing Authority Server

FIG. 2 illustrates an embodiment of the member processing server 104 of the system 100. It will be apparent to persons having skill in the relevant art that the embodiment of the member processing server 104 illustrated in FIG. 2 is provided as illustration only and may not be exhaustive to all possible configurations of the member processing server 104 suitable for performing the functions as discussed herein. For example, the computer system 800 illustrated in FIG. 8 and discussed in more detail below may be a suitable configuration of the member processing server 104.

The member processing server 104 may include a receiving device 302. The receiving device 302 may be configured to receive data over one or more networks via one or more network protocols. In some instances, the receiving device 302 may also be configured to receive data from signing authority servers 104, participant devices 106, and other entities via suitable communication networks, such as local area networks, wide area networks, radio frequency networks, the Internet. In some embodiments, the receiving device 302 may be comprised of multiple devices, such as different receiving devices for receiving data over different networks, such as a first receiving device for receiving data over near field communication and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by signing authority servers 102. Data signals received from signing authority servers 102 may be superimposed with signed domain public keys and signed member public keys, as well as signed transaction blocks for validation by the member processing server 104. The receiving device 302 may also be configured to receive data signals from participant devices 106, which may be superimposed with blockchain transactions for inclusion in a new block as well as validation results in instances where participant devices 106 may perform validation of new blocks.

The member processing server 104 may also include a communication module 304. The communication module 304 may be configured to transmit data between modules, engines, databases, memories, and other components of the member processing server 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the member processing server 104 and external components of the member processing server 104, such as externally connected databases, display devices, input devices, etc. The member processing server 104 may also include a processing device. The processing device may be configured to perform the functions of the member processing server 104 discussed herein as will be apparent to persons having skill in the relevant art. In some embodiments, the processing device may include and/or be comprised of a plurality of engines and/or modules specially configured to perform one or more functions of the processing device, such as a querying module 306, generation module 308, signing module 310, validation module 312, etc. As used herein, the term "module" may be hardware particularly programmed by specific purpose software to receive an input, perform one or more processes using the input, and provide an output. The input, output, and processes performed by various modules will be apparent to one skilled in the art based upon the present disclosure.

The member processing server 104 may include a querying module 306. The querying module 306 may be configured to execute queries on databases to identify information. The querying module 306 may receive one or more data values or query strings, and may execute a query string based thereon on an indicated database, such as a memory 316, to identify information stored therein. The querying module may then output the identified information to an appropriate engine or module of the member processing server 104 as necessary. The querying module 306 may, for example, execute a query on the memory 316 to identify keys, blockchain data, and other data for use in the methods discussed herein.

The member processing server 104 may include a generation module 308. The generation module 308 may be configured to generate key pairs and shared secrets. The generation module 308 may receive a request as input, may perform the requested functions to generate data, and may output the requested data for use by another module or engine of the member processing server 104. For example, the generation module 306 may be configured to generate key pairs, such as a member key pair used in the signing of hash values and validation of new blocks of blockchain transactions for inclusion in the blockchain. The generation module 306 may be configured to generate member key pairs using any suitable key pair generation algorithm. Member key pairs may be comprised of a member private key and a corresponding member public key. The generation module 306 may also be configured to generate hash values. Hash values may be generated via the application of one or more hashing algorithms to data for the generation thereof. For example, the generation module 306 may be configured to generate hash values for a block in the blockchain. The generation module 306 may also be configured to generate a matching or otherwise corresponding hash value using a suitable method, such as by applying a hashing algorithm to data, performing a calculation using one or more algorithms, etc.

The member processing server 104 may further include a signing module 310. The signing module 310 may be configured to receive data to be signed, may sign the data using a private key, and may output the signed data to another module or engine of the member processing server 104. In some instances, the signing module 310 may also be provided with the private key to use for signing. In other instances, the signing module 310 may obtain the private key, such as by issuing an instruction to the querying module 306 to identify a private key in the memory 316 for use in signing the data. The signing module 310 may be configured to, for example, sign hash values generated by the generation module 208 for inclusion with blockchain transactions in a new block to be included in the blockchain.

The member processing server 104 may also include a validation module 312. The validation module 312 may be configured to receive data for validation, may validate the data, and may output a result (e.g., success or failure) of the validation to another module or engine of the member processing server 104. For example, the validation module 312 may receive (e.g., via the receiving device 302) a signed block, which may be validated by the validation module 312 using a signed domain public key associated with the signing authority server 102 that signed the block. The validation module 312 may also validate signed hash values (e.g., which may be obtained via the validation of a signed block including the signed hash value) using a signed member public key. The member public key may be the member public key generated by the generation module 308, or may be a member public key received from the signing authority server 102 that is associated with the member processing server 104 used to sign the hash value. In the latter instance, the signing authority server 102 may provide (e.g., with the signed block) the signed member public key or an indication which member public key is to be used for validation.

The member processing server 104 may also include a transmitting device 314. The transmitting device 314 may be configured to transmit data over one or more networks via one or more network protocols. In some instances, the transmitting device 314 may be configured to transmit data to signing authority servers 102, participant devices 106, and other entities via suitable communication networks, such as local area networks, wide area networks, radio frequency networks, the Internet. In some embodiments, the transmitting device 314 may be comprised of multiple devices, such as different transmitting devices for transmitting data over different networks, such as a first transmitting device for transmitting data over near field communication and a second transmitting device for transmitting data over the Internet. The transmitting device 314 may electronically transmit data signals that have data superimposed that may be parsed by a receiving computing device. In some instances, the transmitting device 314 may include one or more modules for superimposing, encoding, or otherwise formatting data into data signals suitable for transmission.

The transmitting device 314 may be configured to electronically transmit data signals to signing authority servers 102. Data signals electronically transmitted to signing authority servers 102 may be superimposed with a member public key for signing, signed hash values, transaction blocks to be added to the blockchain, validation results, and other data suitable for use in performing the functions discussed herein. The transmitting device 314 may also be configured to electronically transmit data signals superimposed with signed transaction blocks to participant devices 106 for validation thereby.

The member processing server 104 may also include the memory 316. The memory 316 may be configured to store data for use by the member processing server 104 in performing the functions discussed herein. The memory 316 may be configured to store data using suitable data formatting methods and schema and may be any suitable type of memory, such as read-only memory, random access memory, etc. The memory 316 may include, for example, a member private key, a corresponding signed member public key, signed member public keys associated with other member processing servers 102, data associating each additional signed member public key with another member processing server 104, a blockchain, a signed domain public key, etc. The memory 316 may be configured to store the key pair generation algorithm, hashing algorithms, and other algorithms for use in performing the functions of the member processing server 104 discussed herein.

Generation and Distribution of Keys for Digital Signatures

Figure 4:
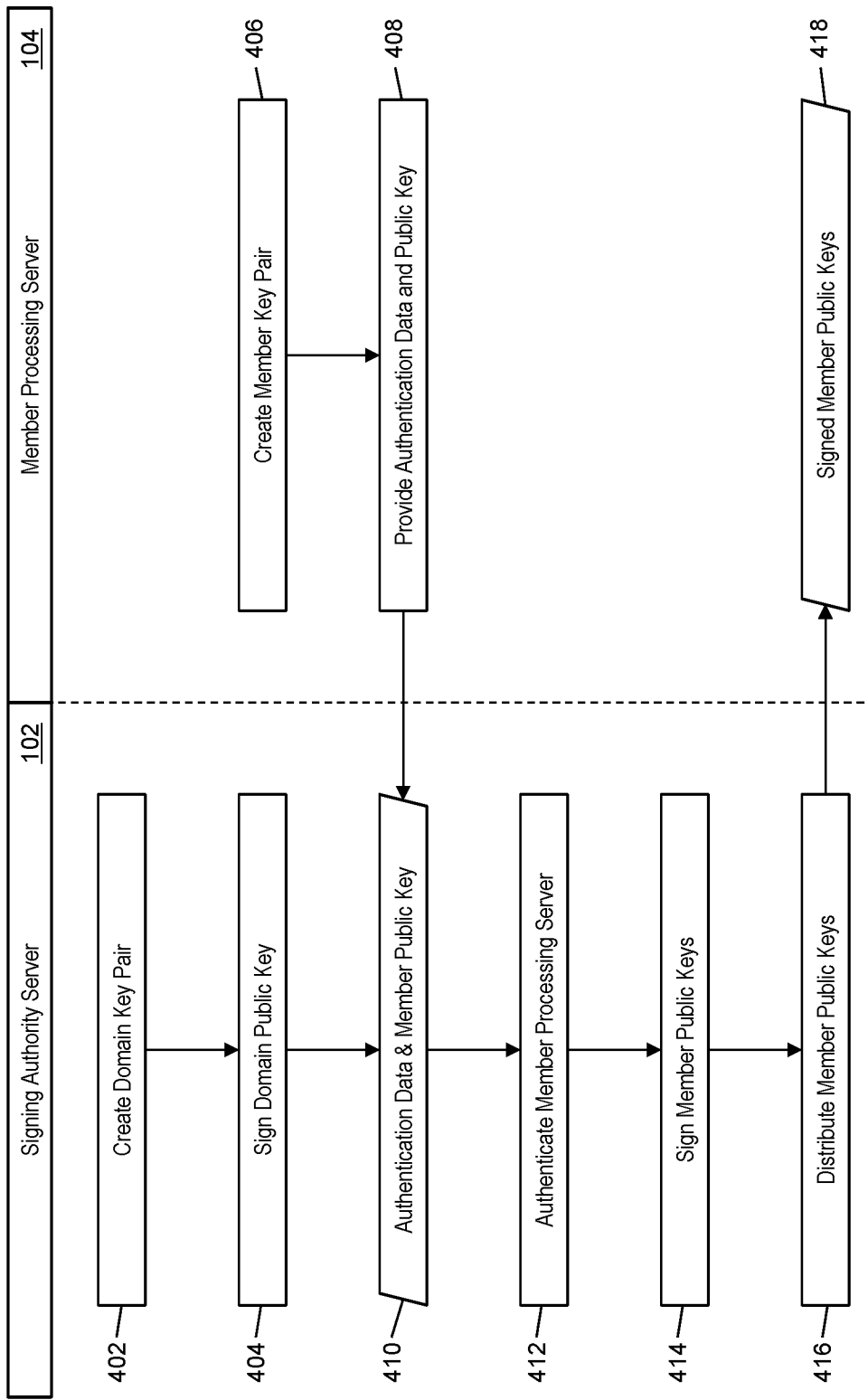
FIG. 4 is a flow diagram illustrating a process flow for generating, signing, and distributing keys for use in digitally signing blockchain transactions in accordance with exemplary embodiments.

FIG. 4 illustrates a process for the generation and distribution of keys by the signing authority server 102 and member processing servers 104 of the system 100 illustrated FIG. 1 for use in the digital signing of blockchain transactions for inclusion in a blockchain.

In step 402, the generation module 208 of the signing authority server 102 may generate a domain key pair. The domain key pair may be generated using a suitable key pair generation algorithm, and may be comprised of a domain private key and a corresponding domain public key. In step 404, the signing module 210 of the signing authority server 102 may self-sign the domain public key. In some instances, the domain public key may be signed using the corresponding domain private key. In other instances, a different private key may be used. In some embodiments, step 404 may be replaced by the signing of the domain public key by a trusted, third party entity.

In step 406, the generation module 308 of a member processing server 104 may generate a member key pair. The member key pair may be generated using a suitable key pair generation algorithm, and may be comprised of a member private key and a corresponding member public key. In step 408, the transmitting device 314 of the member processing server may electronically transmit a data signal to the signing authority server 102 using a suitable communication network, where the data signal is superimposed with the generated member public key and authentication data. The authentication data may be data associated with the member processing server 104 suitable for the identification and/or authentication thereof.

In step 410, the receiving device 202 of the signing authority server 102 may receive the data signal from the member processing server 104. In step 412, the authentication module 212 of the signing authority server 102 may authenticate the member processing server 104 using the provided authentication data. Once authentication is completed, then, in step 414, the signing module 210 of the signing authority server 102 may sign the member public key using the domain private key.

In step 416, the transmitting device 214 of the signing authority server 102 may electronically transmit a data signal to the member processing server 104 using a suitable communication network that is superimposed with the signed member public key, as well as additional signed member public keys associated with other member processing servers 104. In some instances, the signed domain public key may also be transmitted to the member processing server 104. In step 418, the receiving device 302 of the member processing server 104 may receive the data signal for parsing of the data included therein.

Generation and Validation of Digitally Signed Blocks

Figure 5:
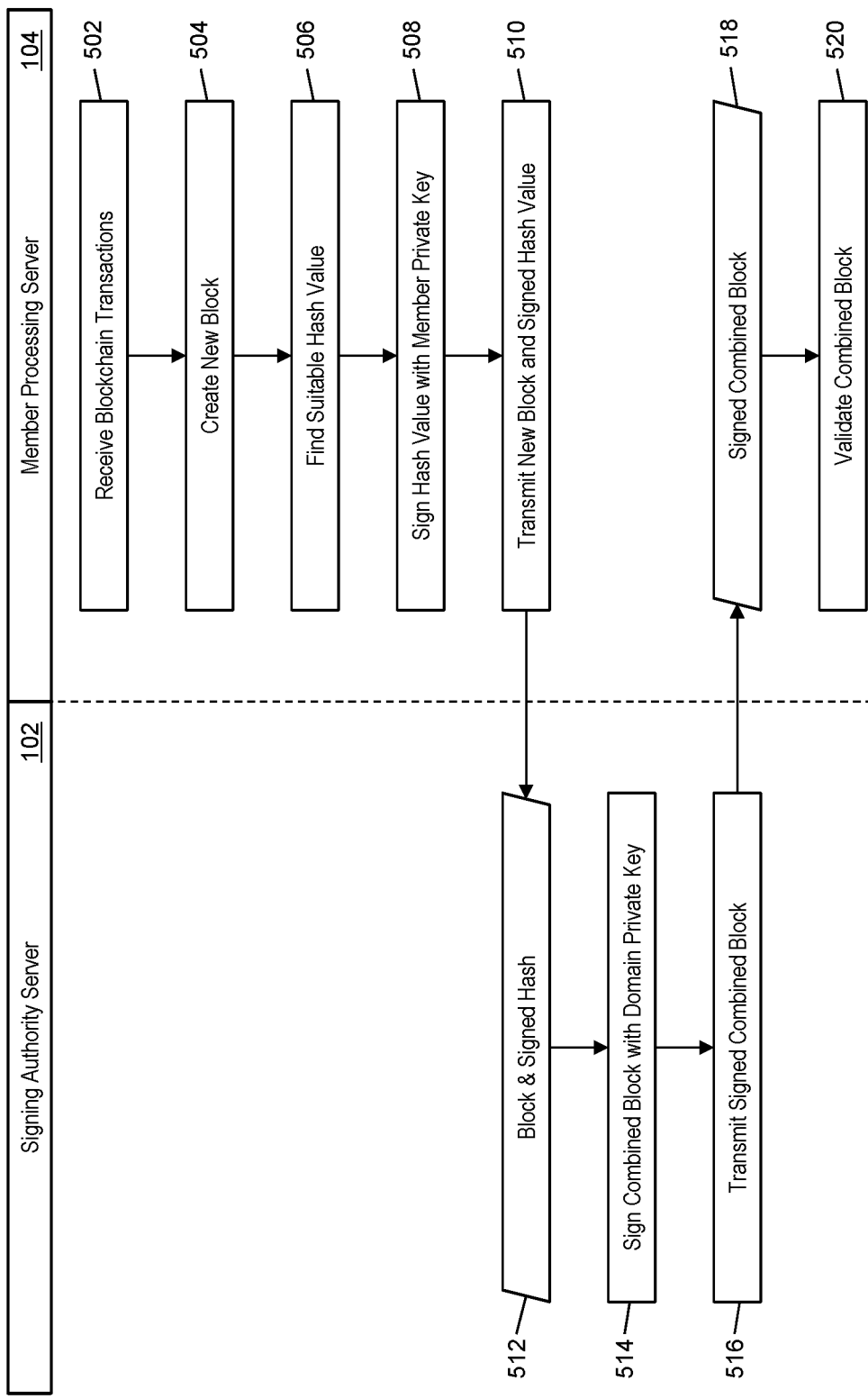
FIG. 5 is a flow diagram illustrating a process for creating and digitally signing blocks of blockchain transactions for inclusion in a blockchain in accordance with exemplary embodiments.

FIG. 5 illustrates a process for the generation of a digitally signed block of blockchain transactions and validation thereof using the signing authority server 102 and member processing server 104 of the system 100 illustrated in FIG. 1.

In step 502, the receiving device 302 of the member processing server 104 may receive a plurality of blockchain transactions. Each blockchain transaction may be received from a participant device 106 and may include data associated with a transaction to be posted to a blockchain associated with the member processing server 104. In step 504, the generation module 308 of the member processing server 104 may generate a new block comprised of the blockchain transactions. In some instances, the block may also include additional data, such as a header, transaction counter, and other data. Additional data included in a block for a blockchain may be dependent on the characteristics of the blockchain as will be apparent to persons having skill in the relevant art.

In step 506, the generation module 308 of the member processing server 104 may find a suitable hash value. The finding of a suitable hash value may include the generation of a first hash value by application of a hashing algorithm to a prior block in the blockchain, such as the block to precede the new block being added, as well as the generation or other identification of a second hash value that corresponds to the first hash value. Once the suitable hash value is identified, then, in step 508, the signing module 310 of the member processing server 102 may sign the hash value using their member private key.

In step 510, the transmitting device 314 of the member processing server 104 may electronically transmit a data signal to the signing authority server 102 using a suitable communication network that is superimposed with the new block and the signed hash value. In step 512, the receiving device 202 of the signing authority server 102 may receive the data signal for parsing of the data superimposed thereon. In step 514, the signing module 210 of the signing authority server 102 may sign the combined block, comprised of the new block and the signed hash value, using their domain private key.

In step 516, the transmitting device 214 of the signing authority server 102 may electronically transmit a data signal superimposed with the digitally signed block to the member processing server 104 using the suitable communication network. In step 518, the receiving device 302 of the member processing server 104 may receive the signed block and, in step 520, the validation module 312 of the member processing server 104 may validate the signed block using the signed domain public key and signed member public key. In some embodiments, steps 518 and 520 may be performed by a different member processing server 104 than the one used in steps 502 through 510. In such embodiments, the validation performed in step 520 may use the signed member public key associated with the member processing server 104 used to sign the hash value in step 508.

Figure 6:
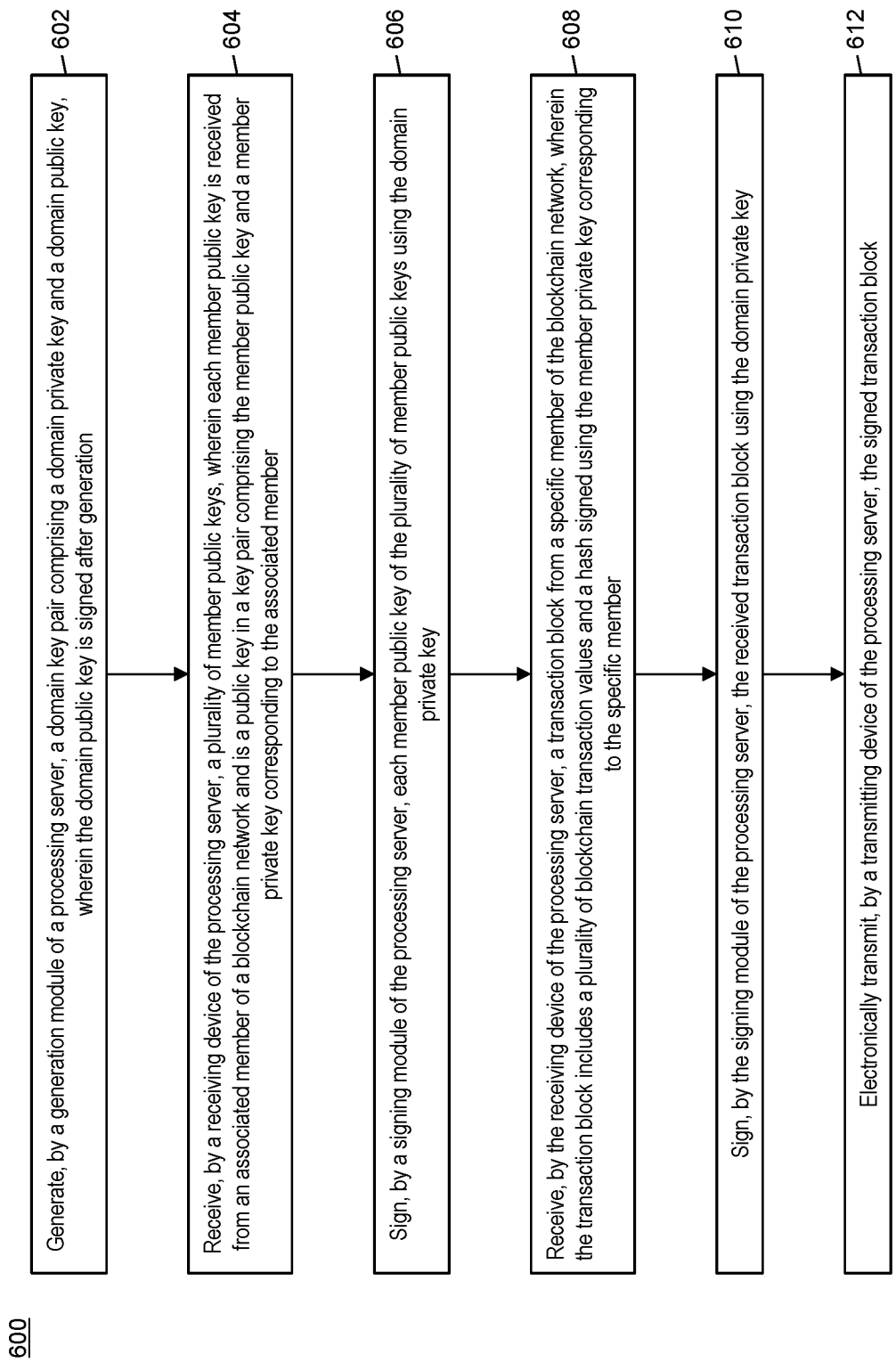
FIGS. 6 and 7 are flow charts illustrating exemplary methods for using digital signatures for signing blockchain transactions in accordance with exemplary embodiments.

First Exemplary Method for Using Digital Signatures for Signing Blockchain Transactions FIG. 6 illustrates a method 600 for the digital signing of a block of blockchain transactions that includes a signed hash value for validation thereof.

In step 602, a domain key pair may be generated by a generation module (e.g., the generation module 208) of a processing server (e.g., the signing authority server 102), wherein the domain key pair comprises a domain private key and a domain public key and where the domain public key is signed after generation. In step 604, a plurality of member public keys may be received by a receiving device (e.g., the receiving device 202) of the processing server, wherein each member public key is received from an associated member (e.g., member processing server 104) of a blockchain network and is a public key in a key pair comprising the member public key and a member private key corresponding to the associated member.

In step 606, each member public key of the plurality of member public keys may be signed by a signing module (e.g., the signing module 210) of the processing server using the domain private key. In step 608, a transaction block may be received by the receiving device of the processing server from a specific member of the blockchain network, wherein the transaction block includes a plurality of blockchain transaction values and a hash signed using the member private key corresponding to the specific member.

In step 610, the received transaction block may be signed by the signing module of the processing server using the domain private key. In step 612, the signed transaction block may be electronically transmitted by a transmitting device (e.g., the transmitting device 214) of the processing server.

In one embodiment, the method 600 may also include electronically transmitting, by the transmitting device of the processing server, each signed member public key to one or more members of the blockchain network. In some embodiments, the domain public key may be signed by a public authority. In other embodiments, the domain public key may be signed by the signing module of the processing server. In one embodiment, the method 600 may further include: receiving, by the receiving device of the processing server, authentication information from each member of the blockchain network; and authenticating, by an authentication module (e.g., the authentication module 212) of the processing server, each member of the blockchain network using the received authentication information prior to signing the associated member public key.

Figure 7:
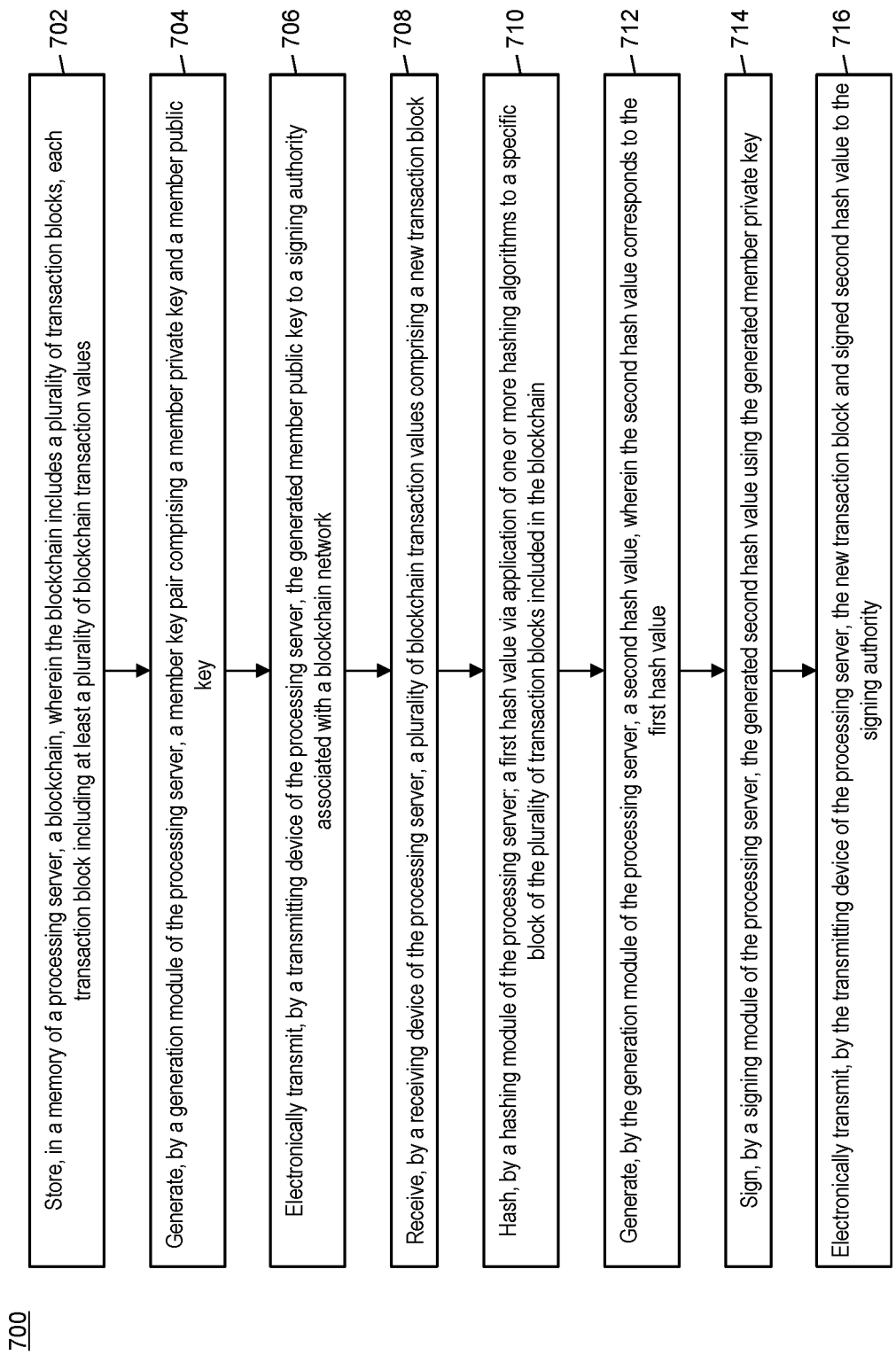

Second Exemplary Method for Using Digital Signatures for Signing Blockchain Transactions FIG. 7 illustrates a method 700 for the digital signing of a hash value for inclusion in a block of blockchain transactions for digital signature and inclusion in a blockchain.

In step 702, a blockchain may be stored in a memory (e.g., the memory 316) of a processing server (e.g., the member processing server 104), wherein the blockchain includes a plurality of transaction blocks, each transaction block including at least a plurality of blockchain transaction values. In step 704, a member key pair comprising a member private key and a member public key may be generated by a generation module (e.g., the generation module 308) of the processing server.

In step 706, the generated member public key may be electronically transmitted by a transmitting device (e.g., the transmitting device 314) of the processing server to a signing authority (e.g., the signing authority server 102) associated with a blockchain network. In step 708, a plurality of blockchain transaction values may be received by a receiving device (e.g., the receiving device 302) of the processing server that comprise a new transaction block.

In step 710, a hashing module (e.g., the generation module 308) of the processing server may hash a first hash value via application of one or more hashing algorithms to a specific block of the plurality of transaction blocks included in the blockchain. In step 712, a second hash value may be generated by the generation module of the processing server that corresponds to the first hash value.

In step 714, the generated second hash value may be signed by a signing module (e.g., the signing module 210) of the processing server using the generated member private key. In step 716, the new transaction block and signed second hash value may be electronically transmitted by the transmitting device of the processing server to the signing authority.

In one embodiment, the second hash value may be generated via application of the one or more hashing algorithms to the received new transaction block. In some embodiments, the method 700 may also include electronically transmitting, by the transmitting device of the processing server, authentication information to the signing authority. In one embodiment, the method 700 may also include: receiving, by the receiving device of the processing server, a signed transaction block and signed domain public key from the signing authority, wherein the signed transaction block includes the new transaction block and signed second hash value and is signed using a domain private key corresponding to the signed domain public key; and validating, by a validation module (e.g., the validation module 312) of the processing server, the signed transaction block using the member public key and signed domain public key. In a further embodiment, validating the signed transaction block may include: applying the signed domain public key to the signed transaction block to yield the new transaction block and signed second hash value; applying the member public key to the signed second hash value to yield the second hash value; and validating the yielded second hash value as corresponding to the generated second hash value.

Computer System Architecture

Figure 8:
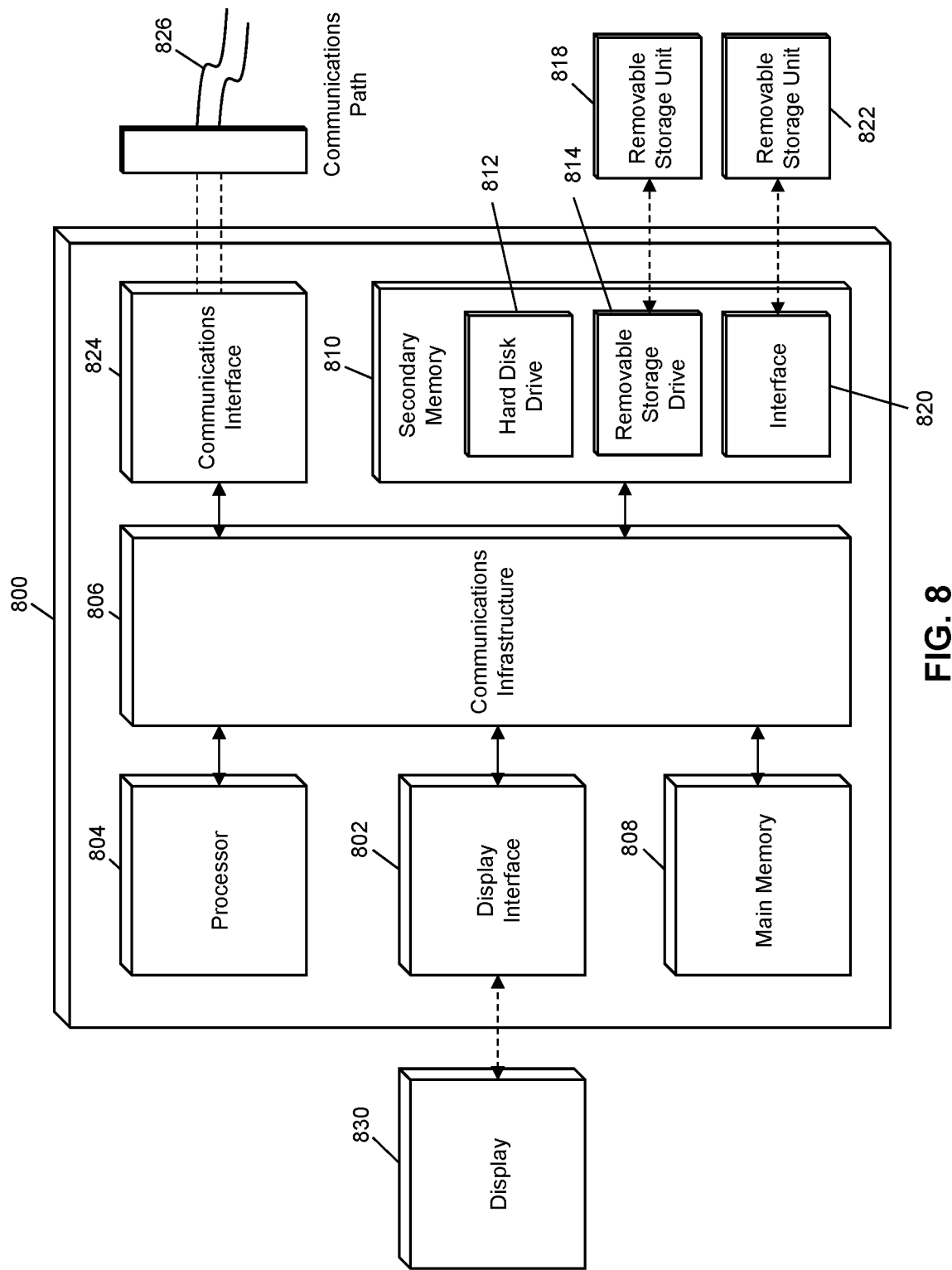
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the signing authority server 102 and member processing server 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for using digital signatures for signing blockchain transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for using digital signatures for signing blockchain transactions, comprising:
   generating, by a generation module of a processing server, a domain key pair comprising a domain private key and a domain public key, wherein the domain public key is signed after generation;
   receiving, by a receiving device of the processing server, a plurality of member public keys;
   signing, by a signing module of the processing server, each member public key of the plurality of member public keys using the domain private key;
   receiving, by the receiving device of the processing server, a transaction block from a specific member of a blockchain network;
   electronically transmitting, by the transmitting device of the processing server, each signed member public key to one or more members of the blockchain network;
   receiving, by the receiving device of the processing server, a new transaction block and a signed second hash value from the specific member of the blockchain network;
   signing, by the signing module of the processing server, the received new transaction block using the domain private key; and
   electronically transmitting, by the transmitting device of the processing server, the signed new transaction block for validation of the blockchain transactions by a member of the blockchain network.

2. The method of claim 1, wherein the domain public key is signed by a public authority.

3. The method of claim 1, wherein the domain public key is signed by the signing module of the processing server.

4. The method of claim 1, further comprising:
   receiving, by the receiving device of the processing server, authentication information from each member of the blockchain network; and
   authenticating, by an authentication module of the processing server, each member of the blockchain network using the received authentication information prior to signing the associated member public key.

5. A system for using digital signatures for signing blockchain transactions, comprising:
   a transmitting device of a processing server;
   a generation module of the processing server configured to generate a domain key pair comprising a domain private key and a domain public key, wherein the domain public key is signed after generation;
   a receiving device of the processing server configured to receive a plurality of member public keys; and
   a signing module of the processing server configured to sign each member public key of the plurality of member public keys using the domain private key, wherein
   the receiving device of the processing server is further configured to receive a transaction block from a specific member of a blockchain network,
   the transmitting device of the processing server is further configured to electronically transmit each signed member public key to one or more members of the blockchain network,
   the receiving device of the processing server is further configured to receive a new transaction block and a signed second hash value from the specific member of the blockchain network,
   the signing module of the processing server is further configured to sign the received new transaction block using the domain private key, and
   the transmitting device of the processing server is further configured to electronically transmit the signed new transaction block for validation of the blockchain transactions by a member of the blockchain network.

6. The system of claim 5, wherein the domain public key is signed by a public authority.

7. The system of claim 5, wherein the domain public key is signed by the signing module of the processing server.

8. The system of claim 5, further comprising:
   an authentication module of the processing server, wherein
   the receiving device of the processing server is further configured to receive authentication information from each member of the blockchain network; and
   the authentication module of the processing server is configured to authenticate each member of the blockchain network using the received authentication information prior to signing the associated member public key.

* * * * *